United States Patent [19]
Reyes

[11] Patent Number: 5,330,250
[45] Date of Patent: Jul. 19, 1994

[54] LINER FOR A SHOPPING CART CHILD SEAT

[76] Inventor: Guadalupe E. Reyes, 13861 Fernwood Dr., Garden Grove, Calif. 92643

[21] Appl. No.: 851,339

[22] Filed: Mar. 16, 1992

[51] Int. Cl.$^5$ ............................................. A47C 27/00
[52] U.S. Cl. ............................... 297/229; 297/256.16; 297/256.17
[58] Field of Search .............. 297/484, 229, 219, 218, 297/250, 255; 280/33.993, 33.992

[56] References Cited

U.S. PATENT DOCUMENTS

| | | | |
|---|---|---|---|
| 3,459,450 | 8/1969 | Patellaro | 297/254 |
| 3,578,380 | 5/1971 | Jacobus | 297/229 |
| 3,861,742 | 1/1975 | Leonard et al. | 297/216 |
| 4,108,489 | 8/1978 | Salzman | 297/250 X |
| 4,204,695 | 5/1980 | Salzman | 297/250 X |
| 4,324,430 | 4/1982 | Dimas | 297/250 |
| 4,348,049 | 9/1982 | Monot et al. | 297/254 |
| 4,416,462 | 11/1983 | Thompson | 297/250 X |
| 4,568,125 | 2/1986 | Sckolnik | 297/229 |
| 4,598,945 | 7/1986 | Hopkins | 280/250 |
| 4,805,937 | 2/1989 | Boucher et al. | 280/33.992 |
| 4,834,460 | 5/1989 | Herwig | 297/485 |
| 4,867,464 | 9/1989 | Cook | 280/33.993 |
| 4,877,289 | 10/1989 | Herrera | 297/250 |
| 4,889,388 | 12/1989 | Hime | 297/250 X |
| 5,156,436 | 10/1992 | Grene | 297/250 |

FOREIGN PATENT DOCUMENTS 2012160 7/1979 United Kingdom ................ 297/229

OTHER PUBLICATIONS

"One Step Ahead" Catalog, p. 11, Baby Seat, #444.
"Graco® Jumper" Ad, Graco Children's Products, Inc.
"Fold 'n Travel" Ad, Playskool Baby, Inc.
"Travel Tandem" Ad, Evenflow Juvenile Furniture Co.
Rosie's Babies Packaging Sample, By Diplomat.
"One Step Ahead" Catalog, p. 4, Cart-A-Kid, ® TM 136.
"One Step Ahead" Catalog, p. 4, Snug Seat, #740, 741.
"One Step Ahead" Catalog, p. 10, Super Shopper Kit, #604.

Primary Examiner—Laurie K. Cranmer
Attorney, Agent, or Firm—Macro-Search Corp.

[57] ABSTRACT

An apparatus is provided which supports a seated infant in a shopping cart. Side members comfortably support the infant in an upright position while allowing the infant to move his head and arms freely. The backrest is padded and made of a flexible material that conforms to an infant's posture when seated. The base is padded and has an extension providing additional comfort to the infant's legs when seated. An attachment strap holds the liner into the child seat, while a restraining strap holds the child within the liner. The upper portion of the backrest folds down for easy storage and transportation of the liner when not in use. The liner is specifically configured to work cooperatively with a wire basket construction shopping cart having protruding wires which provide discomfort to a child sitting within the child seat without a liner.

5 Claims, 3 Drawing Sheets

LINER FOR A SHOPPING CART CHILD SEAT

FIELD OF THE INVENTION

This invention relates generally to a restraining apparatus for an infant. More particularly, this invention relates to an apparatus which provides comfort, support and security for an infant while sitting upright in a shopping cart of the wire basket type.

BACKGROUND OF THE INVENTION

Conventional shopping carts typically include restraining straps which encircle the waist of an infant or small child seated therein. These restraining straps are often insufficient to properly hold the infant in an upright position. An infant aged four months to a year old typically does not have enough balancing skills to remain sitting upright for a long duration of time. Thus, the infant will have a tendency to slide down in the seat or to lean sideways due to the lack of lateral support provided by such restraining straps or will fall forward due to the low position of the straps. Further, shopping carts typically have hard seats which may cause discomfort for the infant especially due to the large upwardly protruding wires of the basket type child seat. Accordingly, an infant not well supported tends to become restless and irritable. Additionally, an infant in such a shopping cart may try to free himself, potentially causing serious injury. It is a well documented fact that a large number of children fall from shopping carts each year. Supermarkets and department stores offer a few shopping carts with infant seats permanently mounted therein. However, these seats are usually unable to restrain the infant in an upright position. Presently available restraining apparati typically consist of waist and shoulder straps which hold the infant upright. One considerable drawback of devices of this type is that the infant's freedom of movement is too restricted. Further, the straps are not padded, thus adding to the infant's discomfort.

Other existing devices were invented to increase an infant's comfort while seated in a shopping cart or high chair. One such device covers the handle and seat of a shopping cart with padded fabric. One drawback to such devices is that the infant is not supported. The degree of support provided by such apparati is minimal since they are constructed of soft pliable materials with no straps available to restrain the infant.

Clearly, there is a need for a device that may be used with shopping carts while providing support to the infant so that he is retained in an upright position while still being able to move his upper body. Such a needed device would provide the infant lateral support while maintaining comfort. Further, in such a device the infant would remain occupied when given the ability to move his head and arms freely. Such a device would additionally be lightweight, flexible, strong, have padding to insulate the child from the protruding wires of a shopping cart child seat and would be able to fit into a cart child seat using the seat as support while providing the necessary padding. The present invention fulfills these needs and provides further related advantages.

SUMMARY OF THE INVENTION

A seat liner is designed to be inserted into the a fold-out child seat within a shopping cart. The child seat is constructed of horizontal wires forming a horizontal seat member and a near vertical backrest member. The liner has a base which has a generally rectangular, flat, upward facing, surface the base fits into and is supported by the horizontal member of the fold-out child seat, the base lying generally between upwardly protruding child seat wires. A pair of side arms is constructed with a rigid interior core covered by a cushioned, compliant overcover the side arms being fixedly mounted onto the upward facing surface and extending upwardly therefrom to define a space therebetween for accepting, with lateral support, the torso of the child, when the child weighs approximately fifteen to twenty-six pounds.

One portion of each of the interior cores extends to the rear of the child, above the protruding wires of the child seat and is connected to a backrest which has is generally rectangular. The backrest is attached to each one of the interior cores at the one portion thereof so that the backrest is positioned above the upwardly protruding child seat wires and rests in contact with the near vertical member of the fold-out child seat. A principle feature of the invention is a belt attached to a lower back portion of the backrest of the invention that secures the seat liner to the shopping cart. Another belt secures the infant to the seat liner and is positioned at a height that will prevent the child from falling forward.

Another feature of the invention is the simplicity of its use. The seat liner is relatively easy to attach to a shopping cart or high chair providing the guardian with one hand free to hold the infant while securing the seat liner into the shopping cart. Further, the invention stores easily in a compact case due to the fact that the base portion is highly flexible and the back portion folds in half. Also, the backrest of the seat liner may flex under the infant's weight while still supporting the infant in an upright position. The ability to flex allows the infant to move and stretch while being continually supported.

The present invention supports an infant comfortably and securely in an upright position while still allowing him to move his head and arms freely. The seat liner attaches securely to a wide variety of shopping carts. The seat liner's construction allows for easy storage and attachment. The invention can flex under the weight of an infant and thus conform to the infants shape giving the infant security and comfort. The liner is thick-enough to prevent the protruding wires of the child seat from poking the child. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
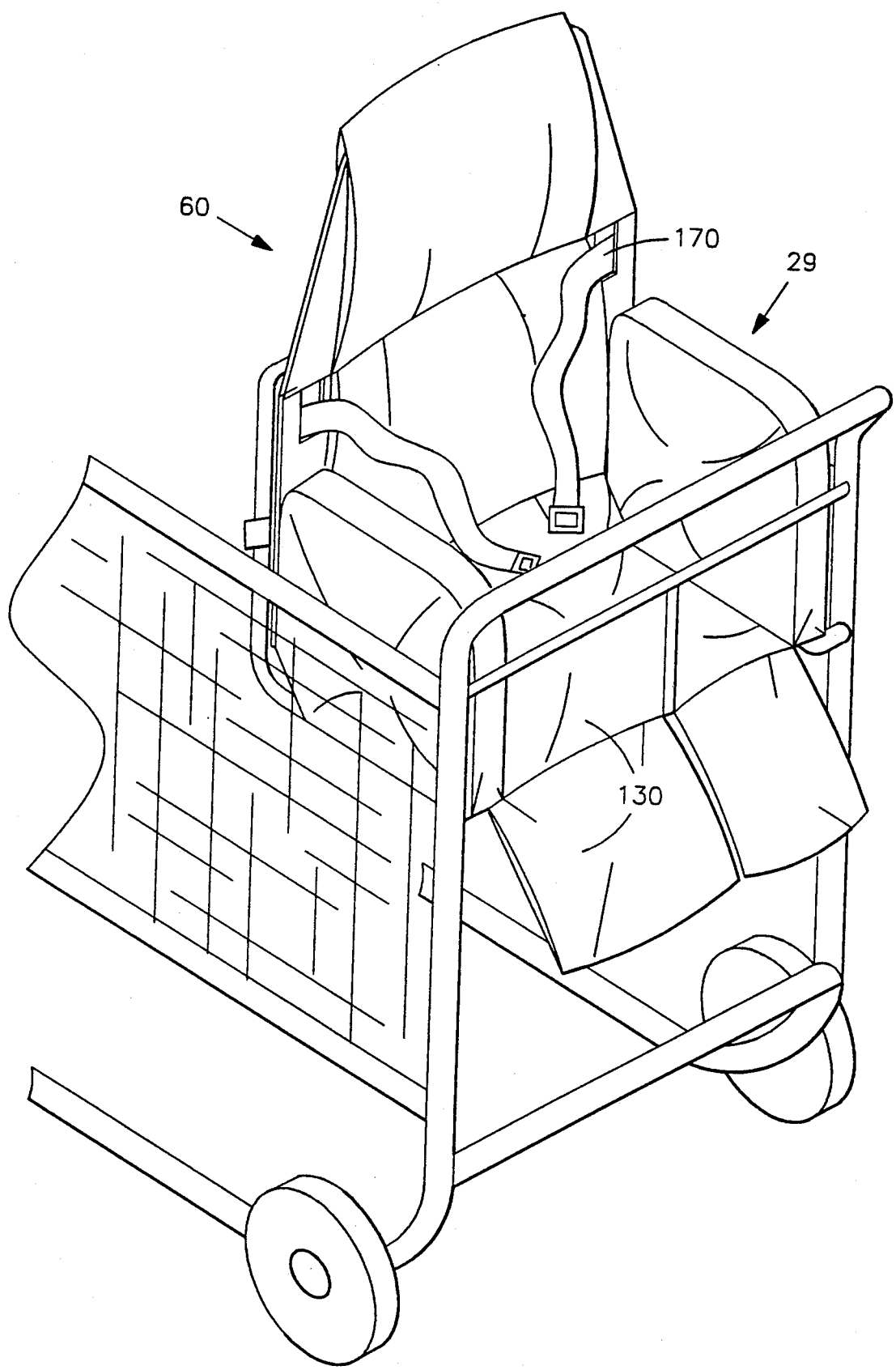
FIG. 1 is a perspective view of a baby seat liner supported in a child seat of a shopping cart made of wire construction.
Figure 2:
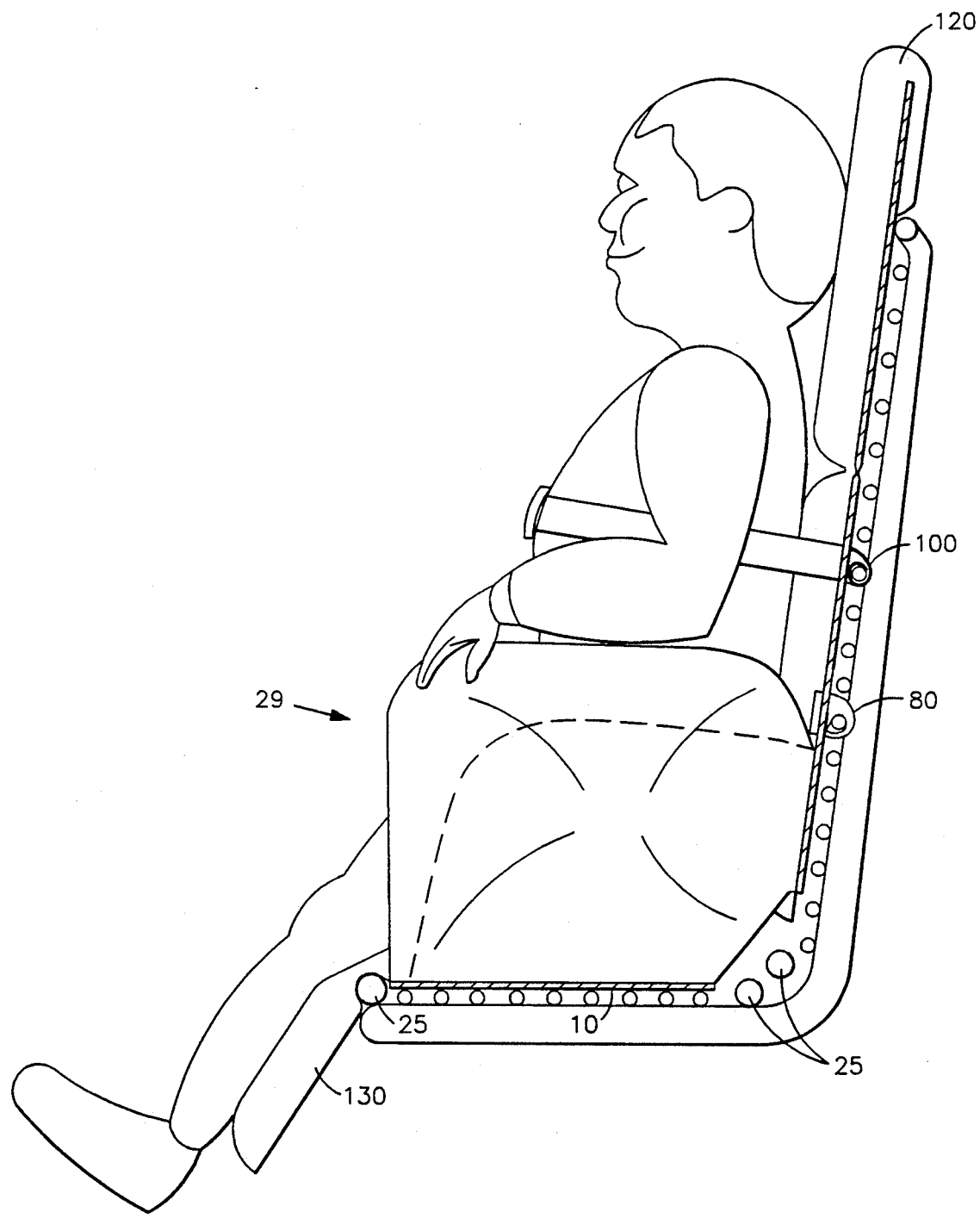
FIG. 2 is a left-side view of the embodiment of FIG. 1 showing a child in the seat-liner.
Figure 3:
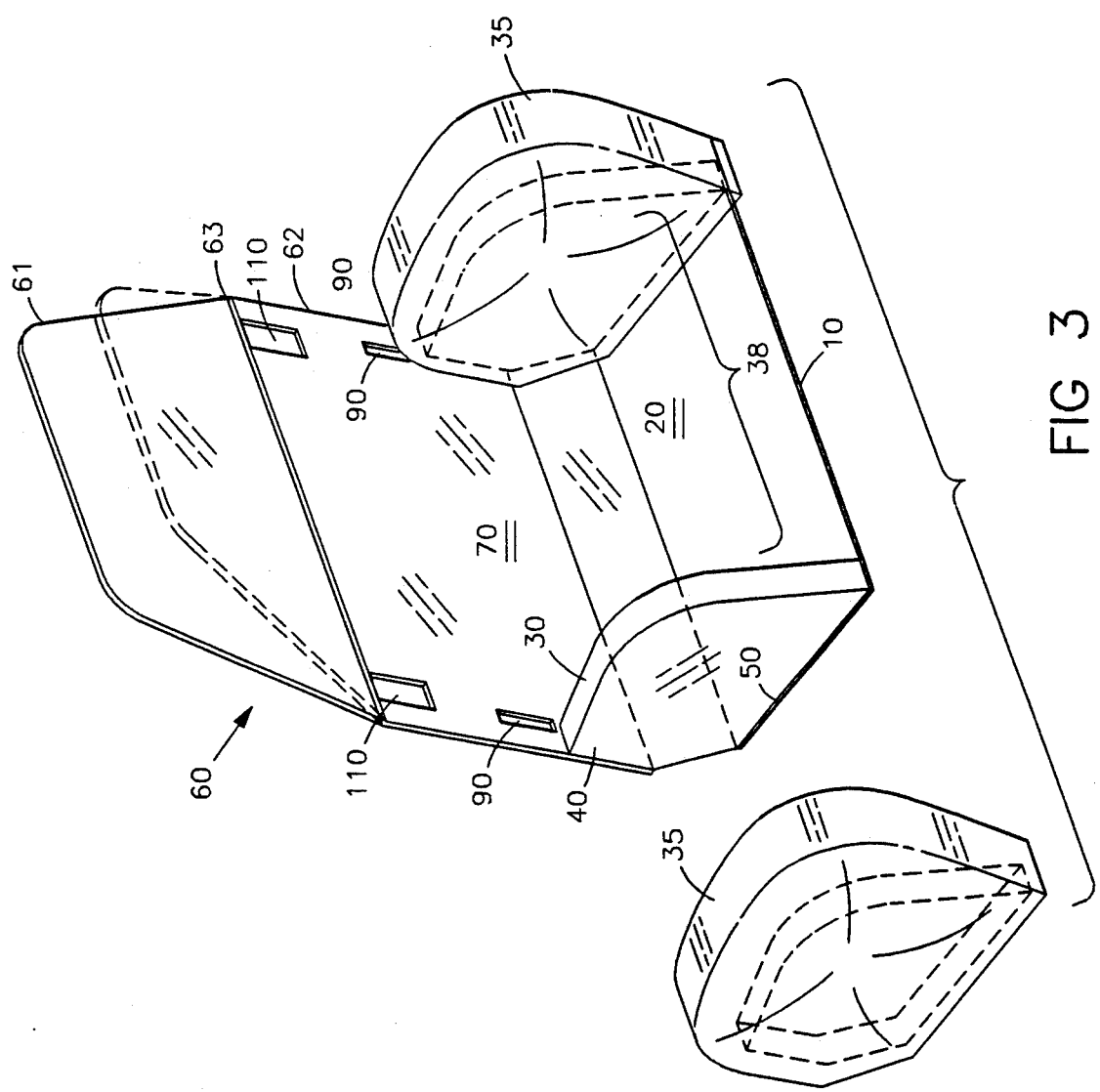
FIG. 3 is a perspective view of the seat liner of FIG. 1, showing seat liner components with one sidearm overcover shown to one side for disclosure of the interior support element.

The current disclosure of a new and useful seat liner for supporting a child in a shopping cart is shown in FIGS. 1-3. The seat liner is inserted into the a fold-out child seat within the shopping cart. The child seat is constructed of horizontal wires forming a horizontal seat member and a near vertical backrest member. The liner has a base 10 which has a generally rectangular, flat, upward facing, surface 20, the base 10 fibs into and is supported by the horizontal member of the fold-out child seat, the base 10 lying generally between upwardly protruding child seat wires 25. A pair of side arms 29 is constructed with a rigid interior core 30 covered by a cushioned, compliant overcover 35, the side arms 29 being fixedly mounted onto the upward facing surface 20 and extending upwardly therefrom to define a space 38 therebetween for accepting, with lateral support, the torso of the child, when the child weighs approximately fifteen to twenty-six pounds.

One portion 40 of each of the interior cores 30 extends to the rear of the child, above the protruding wires 25 of the child seat and is connected to a backrest 60 which has a generally rectangular near vertical, flat surface 70. The backrest 60 is attached to each one of the interior cores 30 at the one portion 40 thereof so that the backrest is positioned above the upwardly protruding child seat wires 25 and rests in contact with the near vertical member of the fold-out child seat.

The backrest 60 has means for removable attachment 80 of the backrest 60 to the near vertical member for restraint of the seat liner within the child seat. Preferably this is a restraining belt looped into a pair of slots 90 in the backrest 60 and the near vertical member of the child seat. A child restraining belt means 100 holds the child within the seat liner. Preferably, this is a conventional seat belt looped through a second pair of slots 110 in the backrest 60. Backrest cushion means 120 supports the torso and head of the child, while base cushion means 130 supports the weight of the child. Base cushion means 130 extends under the legs of the child to cushion the legs against discomfort from the upwardly protruding child seat wires 25.

In one embodiment the backrest 60 has an upper 61 and lower 62 portions connected by a horizontal hinge 63. The upper portion 61 folds downwardly over the lower portion 62 for compact storage of the liner. The liner is preferably made of materials that are extreme light weight and have high flexibility, permitting the liner to conform to the shape of the child and to flex with the weight of the child conforming to the child seat so that the support members of the child seat provide restraint of the child in the seat liner. Therefore the liner itself does not need to have the strength and solid construction for supporting the moving child but uses the strength of the child seat itself for strength providing cushioned comfort to the seated child.

The backrest 60 preferably extends behind the head of the child to prevent contact between the head and elements of the child seat. The restraining belt means 100 is positioned under the armpits of the child to prevent the child from falling forward in the seat liner. The Child is held by the side arm overcovers 35, the backrest 60 and the restraining means 100 in a comfortable upright position insulated from the uncomfortable child seat wires. While the invention has been described with reference to a preferred embodiment, it is to be clearly understood by those skilled in the art that the invention is not limited thereto. Rather, the scope of the invention is to be interpreted only in conjunction with the appended claims.

What is claimed is;

1. A seat liner for supporting a child in a shopping cart, the cart having a fold-out child seat for supporting the child thereupon, the seat constructed of horizontal wires, the liner comprising:

a base of stiff sheet material having a generally rectangular, flat, upward facing, surface, the base fitting into and removably supported by a horizontal member of the fold-out child seat, the base lying generally between upwardly protruding child seat wires;

a pair of side arms, each of the side arms having a rigid interior core and a compliant overcover, the side arms being fixedly mounted onto the upward facing surface and extending upwardly therefrom to define a space therebetween for accepting, while providing lateral support, the torso of a 15 to 26 pound child, one portion of each of the side arms extending to the rear of the child, above the protruding wires on one side of the child seat;

a flexible backrest of stiff sheet material having a generally rectangular near vertical, flat surface, the backrest being attached to each one of the side arms on the one portion thereof so that the backrest is supported and positioned above the upwardly protruding child seat wires and rests in contact with a near vertical member of the fold-out child seat, the backrest having means for removable attachment of the backrest to the near vertical member for restraint of the seat liner within the child seat, and child restraining belt means for holding the child within the seat liner;

the backrest having backrest cushion means for supporting the torso and head of the child, the base having base cushion means for supporting the weight of the child thereupon, the base cushion means extending under the legs of the child to cushion the legs against discomfort from the upwardly protruding child seat wires.

2. The liner of claim 1 wherein the backrest has an upper and a lower portion, the portions connected by a horizontal hinge, for folding the upper portion onto the lower portion for compact storage of the liner.

3. The liner of claim 1 wherein the materials of construction are of extreme light weight and high flexibility, permitting the liner to conform to the shape of the child and to flex with the weight of the child conforming to the child seat so that the support members of the child seat provide restraint of the child in the seat liner.

4. The liner of claim 1 wherein the backrest extends behind the head of the child to prevent contact between the head and the child seat.

5. The liner of claim 1 wherein the child restraining belt means is positioned under the armpits of the child to prevent the child from falling forward in the seat liner.

* * * * *